INVENTORS.
LUTHER W. RICKETTS, JR.,
ROBERT E. STALCUP and
ROBERT J. ERICKSON
BY
Lockwood, Woodard, Smith & Weikart
Attorneys INVENTORS.
LUTHER W. RICKETTS, JR.,
ROBERT E. STALCUP and
BY ROBERT J. ERICKSON
Lockwood, Woodard, Smith & Weikart
Attorneys INVENTORS.
LUTHER W. RICKETTS, JR.,
ROBERT E. STALCUP and
ROBERT J. ERICKSON
BY Lockwood, Woodard, Smith & Weikart
Attorneys INVENTORS.
LUTHER W. RICKETTS, JR.,
ROBERT E. STALCUP and
BY ROBERT J. ERICKSON Lockwood, Woodard, Smith & Weikart
Attorneys

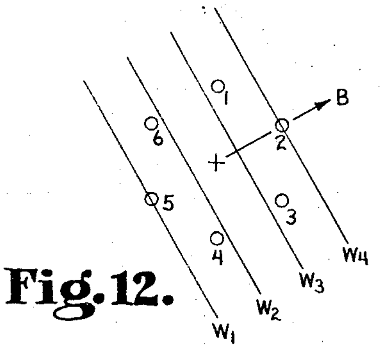
Fig. 12.
| | 1 | 2 | 3 | 4 | 5 | 6 |
|---|---|---|---|---|---|---|
| W4 | A | B | C | D | E | F |
| W3 | BF | AC | BD | CE | DF | AE |
| W2 | CE | DF | AE | BF | AC | BD |
| W1 | D | E | F | A | B | C |
Fig. 13.
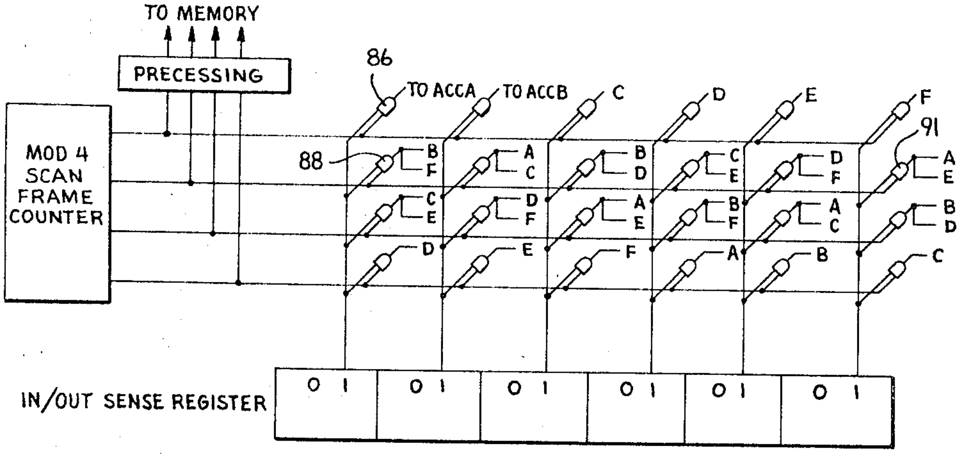
Fig. 14.
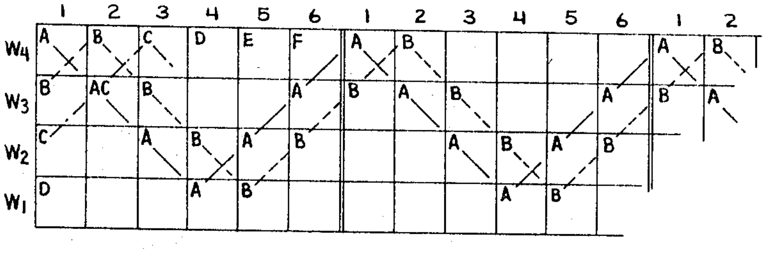
Fig. 16.
INVENTORS.
LUTHER W. RICKETTS, JR.,
ROBERT E. STALCUP and
BY ROBERT J. ERICKSON
Lockwood, Woodard, Smith & Weikart
Attorneys INVENTORS.
LUTHER W. RICKETTS, JR.,
ROBERT E. STALCUP and
ROBERT J. ERICKSON
BY
Lockwood, Woodard, Smith & Weikart
Attorneys INVENTORS.
LUTHER W. RICKETTS, JR.,
ROBERT E. STALCUP and
ROBERT J. ERICKSON
BY Lockwood, Woodard, Smith & Weikart
Attorneys INVENTORS.
LUTHER W. RICKETTS, JR.,
ROBERT E. STALCUP and
ROBERT J. ERICKSON
BY Lockwood, Woodard, Smith & Weikart
Attorneys 3,449,711
BEAM FORMER
Luther W. Ricketts, Jr., Urbana, Robert E. Stalcup, Champaign, and Robert J. Erickson, St. Joseph, Ill., assignors to The Magnavox Company, Fort Wayne, Ind., a corporation of Delaware
Filed Aug. 30, 1965, Ser. No. 483,434
Int. Cl. H04b *13/00;* G01s *3/80, 5/18*
U.S. Cl. 340—6 12 Claims

ABSTRACT OF THE DISCLOSURE

Signals from different energy transducers are delayed and combined to indicate the directional location of a source whose energy reaches the transducers. The signals are clipped and stored in a digital memory device in such a manner that certain groups of signals represent predetermined directional beams. The stored signals are gated to a plurality of accumulators to provide directional information.

This invention relates generally to object detection, range finding, and locating apparatus, and relates particularly to apparatus capable of receiving signals in a stationary array of energy sensing devices and processing the signals to produce outputs determined by wave propagation components in various specific directions or "beams."

Where an array of transducers is employed to receive sound or other vibrational waves which may originate in any one or more of a variety of locations with respect to the array, the waves arriving from any specific beam direction may reach the various transducers at different times, depending upon the configuration of the array and its orientation with respect to the origin of the waves. If it is desired to produce an output as the result of a specific directional component of wave propagation, and obtain the benefit of the signals arriving at all transducers of the array, it has normally been necessary to employ delay lines to delay the outputs from the various transducers the amount necessary to obtain the effect of simultaneous arrival of waves from the direction of interest, at all transducers simultaneously.

In some equipment employing delay lines, the transducer array itself has been rotated from one position to another to obtain directional information. In other arrangements employing stationary arrays, various sets of delay lines, and switching means, have been incorporated to obtain the directional or beam forming effect. Disadvantages of such systems have been overcome to some extent by apparatus such as disclosed in United States Letters Patent No. 3,039,094 granted to Victor C. Anderson, June 12, 1962. The apparatus disclosed in that patent employed magnetic core shift registers wherein the delays required for the beam forming functions were obtained by shifting input signals through the shift registers. Each shift register was associated with an element of the array. A disadvantage of such an arrangement is the fact that each core of each shift register is separated from the next by an electronic impedance-matching and gating network. Thus, the cores cannot be physically arranged in any sort of isolated array containing only cores and wires. Furthermore, the manner in which the wires are threaded through the cores is absolutely dependent on the geometry and dimensions of the transducer array. A different array cannot be used without rebuilding the entire machine.

It is therefore a general object of the present invention to provide an improved beam former.

A further object is to provide a beam former of simpler, more compact, more economical, and more reliable construction than beam formers heretofore known.

A further object is to provide a beam former easily adapted to various transducer array geometries.

A further specific object is to provide a beam former in which information storage can be accomplished in a simple magnetic core memory array consisting only of cores and wires.

A further object is to provide a beam former construction readily adapted to arrays of various sizes and numbers of elements, in addition to various geometries.

A still further object is to provide a beam former readily adjustable to varying environmental conditions such as wave propagation velocities, for example; capable of storing a large amount of information in a limited memory capacity with negligible signal deterioration, and producing continuously a plurality of outputs, each representing a different beam.

Described briefly, a typical embodiment of the present invention employs a digital memory wherein each word includes one bit for each of the transducer elements of the array. All of the bits in a word represent a single simultaneous sampling of the information at all elements of the array, the coding being such as to recognize only zero crossing points of the information arriving at the transducer elements.

Subsequent samples are taken at the array at time intervals adapted to approximate the various delays required in the formation of the directional beams. Each sample frame is loaded into the memory as a separate word at a separate address, and the number of different addresses used is equal to the number of different delays involved in the formation of the beams. The result is that the memory, at all times, has the number of samples therein representing all of the transducer information received during the period of time required for the waves being monitored to pass completely across the maximum dimension of the array.

Between each sample and the next subsequent sample, the memory is read out completely and the information stored therein is appropriately gated to various adders and accumulators, each adder and accumulator producing an output representing one of the directional beams of interest.

During each complete read out or scan of the memory, all of the words except the one representing the oldest information, are reinserted in the same addresses as initially loaded. After read out of the oldest word, a new word is loaded into its memory address, the new word having been derived from a new sample.

Precession is used in addressing, so that in each scan of the memory the order by age of words read out, from the first word to the last word read, is constant. In the typical embodiment, for example, the newest word is always read out first and the oldest word is read out last, in each scan. So the effect of precession of the information through the memory, is obtained without changing the address of any memory word, thus achieving the reliability attainable by returning words to their original addresses.

The full nature of the invention will be understood from the accompanying drawings and the following description and claims:

FIG. 12 illustrates the first step required to determine the memory signal locations required for the formation of another beam, designated beam "B."

FIG. 13 represents the chart filled out for the formation of six different beams.

FIG. 14 represents a matrix of AND gates connected and arranged to produce the combinations required by the chart of FIG. 13.

FIG. 16 represents two or more charts such as that of FIG. 13 and placed side-by-side and showing the periodicity of patterns which can result if the beams to be formed are in directions for which the transducer element layout is symmetrical.

Figure 1:
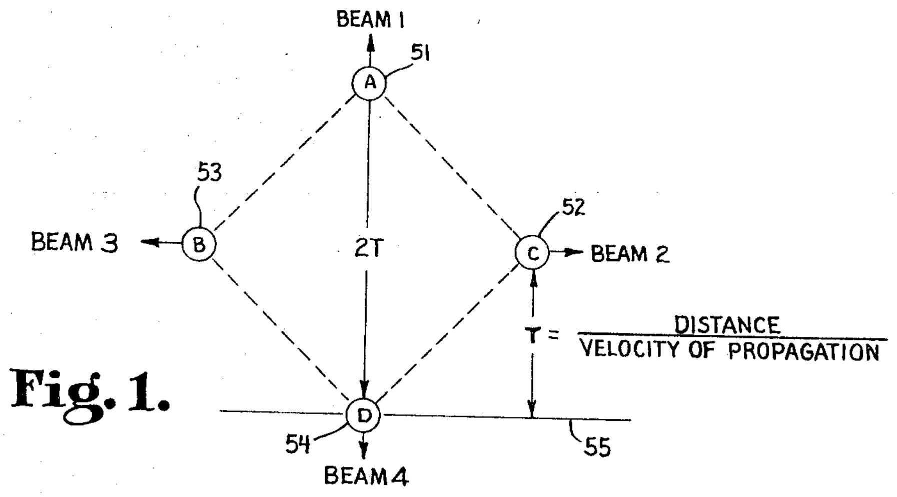
FIG. 1 is a schematic diagram of a simple transducer array, which is employed in the description to illustrate the basic method used in beam forming.

Referring now to FIG. 1, a symmetrical array of four energy sensing elements 51, 52, 53, and 54 is shown, and for purposes of example these may be considered to be omnidirectional hydrophones located in a horizontal plane in a body of water. To form the directional beam designated "beam 1" in the drawing, it is necessary that the output signal representative of the beam be such as would be produced if the signals were present simultaneously in all four hydrophones and if all four hydrophones were disposed in a horizontal line 55 passing through hydrophone 54 and perpendicular to the direction of beam 1. In order to obtain this effect, it is necessary, in the formation of beam 1, to delay the signals in hydrophones 51, 52, and 53 until the signal has arrived at hydrophone 54.

Figure 2:
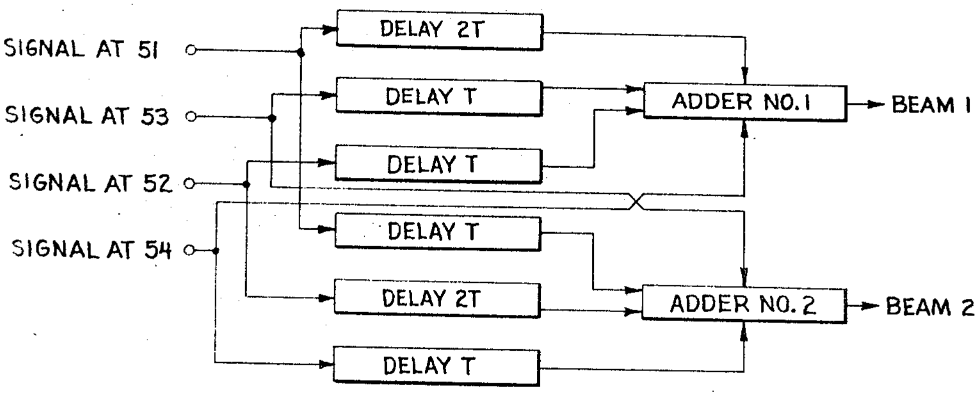
FIG. 2 is a functional diagram used in the explanation of beam forming for the array of FIG. 1.

Assume that it requires the time "T" seconds for sound to travel across half the diagonal of a rectangle whose corners contain the four hydrophones. If the signal from point 51 is delayed 2T seconds, and those from points 52 and 53 are each delayed T seconds, and the signal from point 54 is not delayed at all, the signals will appear to arrive simultaneously, as would be the case if no signals were delayed and if all four hydrophones were disposed along the line 55. This effect can be achieved by an arrangement such as shown in FIG. 2, where beam 1 is formed by adder number 1, to which the inputs from the various transducers are provided after certain delays. The input from transducer 51 is delay 2T seconds. Those from transducers 52 and 53 are delayed T seconds, and that from transducer 54 is not delayed at all. Accordingly, the output of adder number 1 is most sensitive to excitation along the line through transducers 51 and 54. The other three beams shown on the diagram in FIG. 1 are formed in a similar manner. For instance, if beam 2 were to be formed, then 53 needs no delay, 51 and 54 must be delayed by T and 52 delayed by 2T seconds.

Figure 3:
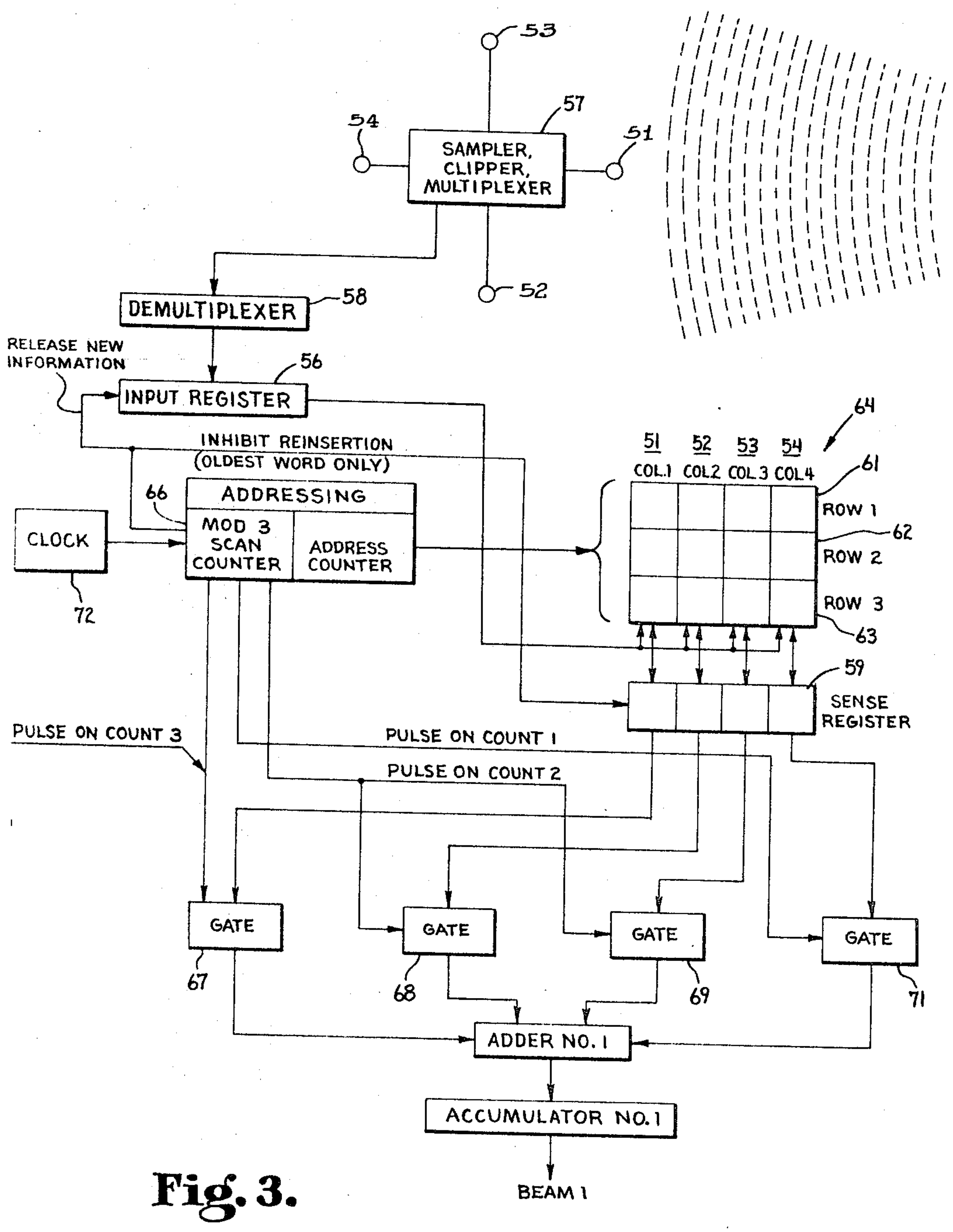
FIG. 3 is a block diagram of a portion of the apparatus employed according to the present invention to form one of the beams for the array of FIG. 1.

Referring now to FIG. 3, the present invention as applied to the array of FIG. 1 is illustrated in block form, with the gating required to form beam 1. To obtain the three different delays required, three separate samples of signals are obtained at the array. In each sample, the signals at all four elements of the array are obtained simultaneously and may be multiplexed and demultiplexed and stored temporarily in a four stage input register 56. The limiting, sampling, and multiplexing may be employed by conventional equipment in the block 57 at the array, with demultiplexing at 58. Thus the sample at each array element is represented by one binary digit and the four bits for the four elements are present as a word in the input register 56. In addition, a compass signal and a synchronizing signal are usually produced at the array and the demultiplexer 58 separates the synchronizing signal, compass signal and samples associated with each hydrophone.

The word in the input register 56 is loaded in parallel into one of the three rows 61, 62, and 63 of the magnetic core memory plane 64. To obtain the three different delay values required, three samples separated by the time "T" are separately obtained and loaded into the memory 64. Assuming that the first sample (the oldest sample) is loaded into row 63, the second sample is loaded into row 62 and the third (most recent) sample is loaded into row 61. All bits in one column of the memory are derived from only one element of the array, but the bit in each row represents a sample taken T seconds apart from the bit in the next adjacent row.

Once the twelve cores of the memory have been loaded, sufficient information is present to form the four beams represented in FIG. 1. For this purpose, a Modulo 3 scan counter 66 is employed and, brings down each word from the memory to the sense register 59 and gates the appropriate bits therefrom to the adder, and then returns the word to the memory. For example, because the word in row 61 represents the newest sample, it can be considered to have the zero delay. The word in row 62, being the second most recent sample has a delay of T seconds and the word in row 63, being the oldest sample, has a delay of 2T seconds. Therefore, referring to FIG. 2 and the delays required to form beam 1, and assuming that the scan counter 66 reads out row 1 first, on count 1 thereof, the only bit in row 61 which is useful to form beam 1 is that in the fourth column and derived from array element 54. Therefore the count 1 pulse is applied to gate 71 to read the bit from row 61 and the fourth column to the adder for beam number 1. Then the word from the sense register is returned to row 61 and on the next count of the scan counter, the word from row 62 is brought down to the sense register. This row has the delay of T, and therefore it is desired to apply the signals derived from elements 52 and 53 to the added for beam 1 on count 2 of the scan counter. Accordingly the count 2 output of the scan counter is applied to gates 68 and 69. Then the word in the sense register is returned to row 62 and on count 3 of the scan counter the word in row 63, the oldest word, is brought down to the sense register. This word, having the 2T delay is useful for beam 1 only to the extent of the bit derived from the array element 51. Therefore on count 3 of the scan counter, the bit from the column corresponding to element 51 is gated at 67 to the adder for beam number 1.

The accumulator is used in forming the beam, because the bits from the various gates arrive in sequence as the scan counter advances. It is by this particular gating arrangement that beam 1 is formed. Three more sets of four gates each are required to form beams 2, 3, and 4. In order to enable use of new samples, the last word brought down to the sense register during a complete readout or scan of the memory by the scan counter 66, is not reinserted in the memory; rather, a new word from the input register is loaded directly into that address of the memory. Accordingly, the oldest word in the memory is replaced by a new word once for each cycle of the scan counter. So it is seen that the rate of the scan counter must be three times the sampling rate at the input register.

In the invention embodiments illustrated herein, only the sense register may read words out of the memory. The sense register 59 my reinsert words into the memory, and the input register may insert new words into the memory. A set of gates connected to the outputs of the sense register provides the path whereby all words of a scan but the last are re-inserted into the memory. On the last word of a scan, this set of gates is inhibited and a corresponding set of gates connected to the outputs of the input register is enabled instead. The command for this operation of disenabling one set of gates and enabling another is generated by the scan counter when the scan counter contains its highest number, which indicates that the last word of a scan is being processed. For purposes of convenience and to avoid confusion in the drawings, these gates should be considered to be included in the blocks representing the registers with which they are associated.

Also it will be recognized that after each scan of the memory, when the new word is loaded, the delays represented by each of the other two words are increased automatically by one increment. However, in view of the fact that they remain in the same rows of the memory as those in which they were initially loaded, it is necessary that they be brought down to the sense register for gating out in the proper sequence. Accordingly address precession is used. Therefore, after the oldest information is removed from row 63 of the memory, and new information or a new word is loaded into row 63, row 63, and not row 61, is read out on the first count or count 1 of the address of scan counter. Then row 61 is read out and then row 62. Then a new word is inserted in row 62, and it is read out first on the next scan, followed by row 63 and row 61. Then, when the new word is loaded into row 61, it is read out first, followed by row 62 and row 63.

It is usually desirable to provide an array of more than four energy sensing elements. In one application of the present invention, an array of thirty elements is employed, for example, and this is represented in the block diagram of FIG. 4. For convenience, all thirty elements are shown in one ring, but actually they may be in several rings, or arranged otherwise than in rings. Formation of thirty beams is accomplished using twenty-five different delay values. The fact that in this example there are thirty beams formed and there are thirty hydrophones is coincidental, because the number of beams formed can readily be more or less than the number of sensing elements, as will be apparent after study of the description herein has been completed. The twenty-five different delay values can be obtained by using one 32 x 32 memory plane. Twenty-five of the thirty-two rows are used for twenty-five different delay values and thirty of the thirty-two columns are used for the thirty input channels. A twenty-sixth row is used to implement precession, and the remaining bits of the plane are unused. As a result of the sampling, each column always contains the last twenty-five bits received from a particular channel, for a particular one of the thirty hydrophones.

Figure 4:
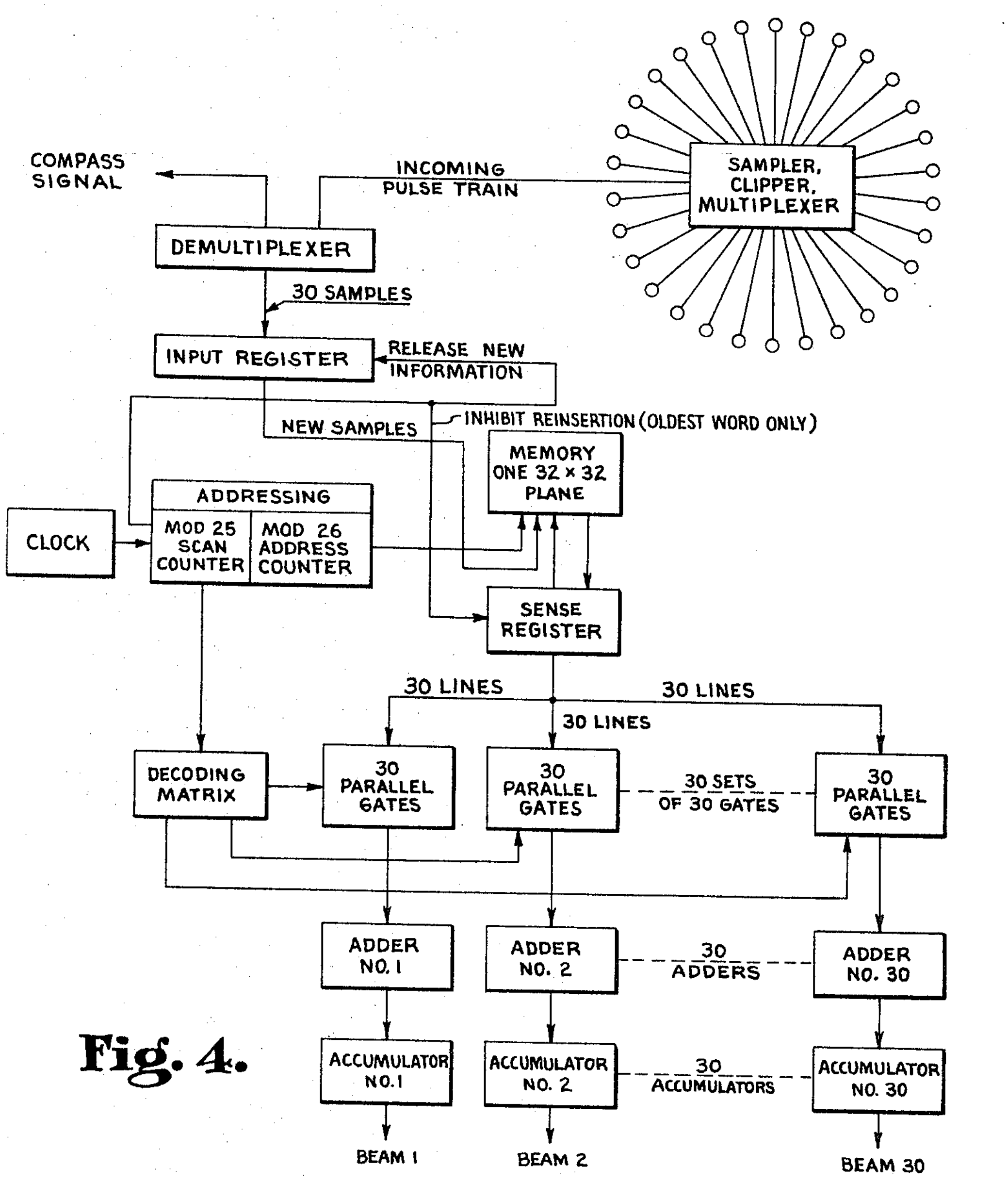
FIG. 4 is a block diagram of a typical embodiment of the present invention wherein a thirty element array is used and thirty beams are formed.

In FIG. 4, which is the block diagram of this arrangement, the sampling, limiting and multiplexing are done at the array and the incoming pulse train from the array includes thirty hydrophone signals, a synchronizing signal and a compass signal. The synchronizing signal is used to separate consecutive sampling frames, each sampling frame consisting of one sample from each of the thirty hydrophones. As mentioned previously, the analog information at a hydrophone is converted to a digital sample signal at the array before multiplexing.

The compass signal contained in the incoming pulse train is sampled at a very low rate so that the hydrophone information will not appreciably be affected by presence of the compass signal in the pulse train. As the pulse train is received, the demultiplexer circuit separates the synchronizing signal, compass signal, and the samples associated with each individual hydrophone.

After demultiplexing, the thirty sample bits for one sample frame are stored in a thirty stage input register shown in FIG. 4, in the same manner as described with reference to FIG. 3. Then the thirty bits are transferred, in parallel, from the input register to the memory at the end of a scan. In this instance, because twenty-five different delay values are present, the scan frame counter is a modulo 25 counter. After each sample frame is loaded into the memory, the most recent twenty-five frames are read out once by the scan counter. The word in each row is brought down to the sense register, the appropriate bits therein gated to the appropriate adders, and then the word is returned to the memory, until all twenty-five words have been brought down. The word of the greatest age, is not reinserted into the memory, but rather is then replaced by a new word. During this scanning of the memory, when the particular samples of the appropriate age to form a particular beam are available, they are gated to the proper adder through the thirty sets of thirty parallel gates. Because the gated samples for a particular adder are not all gated to the adder simultaneously during a scan through the memory, an accumulator is provided at each adder output to integrate the information over the period of read out of the twenty-five memory words.

As mentioned previously, address precessing is used to enable memory read out of words in the order of their age for each scan, and yet permit reinsertion of words into the same addresses from which read during scanning of the memory, and permit insertion of a new word for each scan.

Accordingly, a memory having a length of twenty-six words is used, which is driven by an address counter having a modulus of 26. The address counter is advanced at the same rate as the modulo 25 frame counter. Since both counters advance in an uninterrupted manner and at the same rate, inasmuch as their moduli differ by one, an effect is produced in which the number contained in the address counter (when any given number is contained in the frame counter) is successively reduced by one for each complete successive cycle of the frame counter. A continuous precession of the numbers contained in the two counters is thus obtained.

The following table illustrates the method used to precess information in the beam former. The modulo 25 frame counter runs through twenty-five addresses of the memory and immediately repeats this sequence. There are twenty-five words in a scan and the modulo 25 frame counter keeps track of the word number within a scan. At the last word of a scan, which is the oldest word in the memory and which is addressed when the count in the modulo 25 counter is 25, the word read from the memory is not reinserted. Instead, a new word is written into the memory directly from the input register but does not appear in the sense register until the first word of the second following scan. Thus, address precessing is automatically accomplished with the newest information always at the beginning of a scan and the oldest information at the end of a scan.

For purposes of this example, a scan is defined as the processing of twenty-five successive words of the twenty-six word memory. A new word is always loaded in the twenty-fifth (last word of a scan. There are twenty-six memory words, but there are only twenty-five words in the following scan. Since there is one more address in the memory than in a scan, the newly loaded word does not appear in the scan following that in which it was loaded, but rather as the first word in the second following scan. In the following table, there appears in each scan, just under each address counter number, an Information Word Number, which is indicative of the age of the word in that address and which serves to distinctively identify individual time samples or frames. The greater the Information Word Number, the more recent is that frame. Notice that upon the loading of a new word, the relationship established between that word and the address into which it is loaded is maintained through all successive scans until that word is discarded. Thus any given word is always stored in the same address, even though that word and its corresponding address precess from scan to scan with respect to the twenty-five word scan length.

| | | | | | | | | |
|---|---|---|---|---|---|---|---|---|
| | 1 | 2 | 3 | --- | 23 | 24 | 25 | Word Number (frame number within a scan of Mod 25 counter) |
| | 1 | 2 | 3 | --- | 23 | 24 | 25 | Address Counter (AC) |
| SCAN 1 | 25 | 24 | 23 | | 3 | 2 | 1 | Information Word Number (IWN) (head word 1 load word 27) |
| | 26 | 1 | 2 | --- | 22 | 23 | 24 | AC |
| SCAN 2 | 26 | 25 | 24 | --- | 4 | 3 | 2 | IWN (head word 2 load word 28) |
| | 25 | 26 | 1 | --- | 21 | 22 | 23 | AC |
| SCAN 3 | 27 | 26 | 25 | | 5 | 4 | 3 | IWN (head word 3 load word 29) |
| | 24 | 25 | 26 | --- | 20 | 21 | 22 | AC |
| SCAN 4 | 28 | 27 | 26 | --- | 6 | 5 | 4 | IWN (head word 4 load word 30) |

The word inserted in address 24 in scan 2 does not appear until Scan 4.

Since the twenty-five words, each representing a signal taken at a different time, are all read out of the beam former memory once for each new input sample, the beam former is a time compressor as well as a delay device. The compression ratio for the twenty-five delay device is 25. For example, if the sampling rate for the multibeam array were 12.5 kilohertz the fast clock rate required for the compression ratio of 25 would be 312.5 kilohertz. The sampling rates selected should be consistent with the frequency content of incoming information, the propagation velocity, and the array configuration.

Procedures for determining delays, memory capacity, and gating arrangements will now be described, beginning with reference to FIG. 5 which is a scale drawing of a ring array having N elements (N for this particular case being 6), and showing desired beam directions by the arrows with the reference letters. This array requires a memory matrix having N bits per word. Each word of the memory represents simultaneous samples taken from all elements of the array, and each column corresponds to a particular element of the array.

Figure 5:
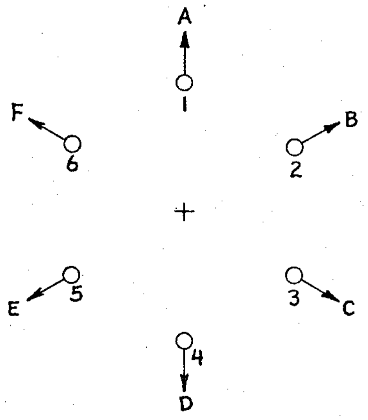
FIG. 5 is a scale drawing of a transducer array, which is used in the description of procedures for determining delays, memory capacity, and gating according to the present invention.

When the scale drawing of FIG. 5 is made, the array elements are numbered. Then a scan chart (FIG. 6) is made and an array element number is assigned to each column of the chart as shown.

Figure 6:
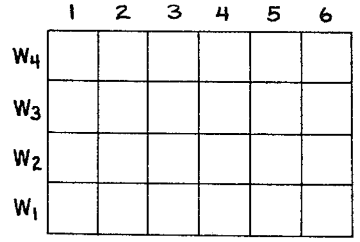
FIG. 6 is a chart used for entering various combinations determined according to the described procedure.
Figure 7:
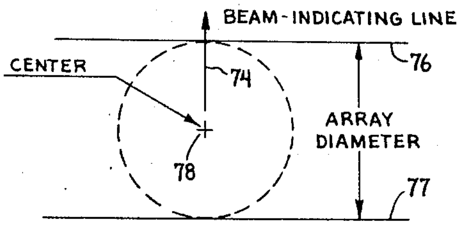
FIG. 7 illustrates the first step in the preparation of a grid used with the array drawing of FIG. 5 to determine the gating combinations required.
Figure 8:
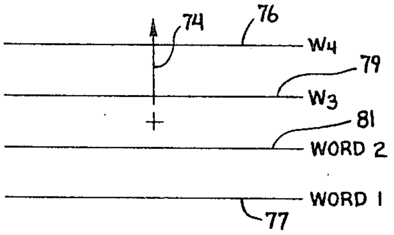
FIG. 8 represents a further step in the construction of the grid.

The next step is to make a transparent grid which can overlay the array drawing. On this grid (shown in FIG. 7) a center point is marked which pivots about the center point of the array drawing. Then a line 74 is drawn with an arrowhead pointing outwardly from the center to indicate the direction of the beam to be formed. Then two parallel lines 76 and 77, perpendicular to the beam indicating line 74, are drawn through points on the beam indicating line equidistant from and on opposite sides of the center 78. The distance between these lines 76 and 77 is equal to the diameter across the array in the scale drawing of FIG. 5. Then equally spaced parallel lines 79 and 81 are drawn in the space between the lines 76 and 77 and parallel thereto. The total number of the parallel lines on the grid will be equal to the number of words in a scan, and for this particular example, four is the appropriate number. To provide correspondence between lines of the grid and words of the scan, each of the four lines and each of the rows in the scan chart of FIG. 6 is given one of the four reference characters W1, W2, W3, and W4, representing word 1, word 2, word 3, and word 4.

Figure 9:
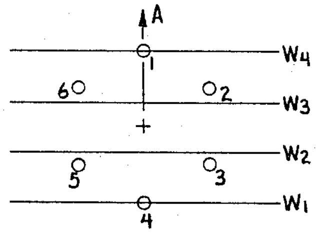
FIG. 9 represents a step in the use of the grid together with the scale drawing of the array.
Figure 10:
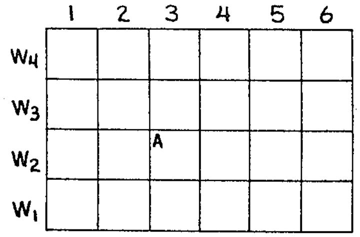
FIG. 10 represents the chart of FIG. 6, but with one entry therein resulting from the performance of one step of the method.
Figure 11:
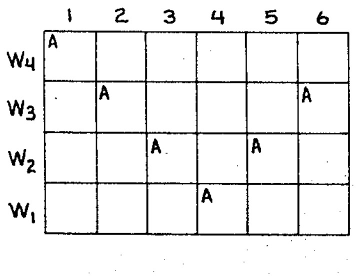
FIG. 11 represents the chart after additional entries have been made and illustrating the combination of signals and delays required to form one beam, which has been designated the "A" beam.

The grid is now completed and is placed on the array drawing as shown in FIG. 9 with the center marks of the grid and array drawings coincident. The grid is then rotated so that the beam-indicating line thereon overlies one of the beam directional arrows of the array drawing and when in this position, the word lines are located to facilitate entry of the appropriate characters on the scan chart of FIG. 6. To do this, for each of the six elements of the array, determine which of the word lines is closest to it. For example, element number 3 is closest to W2. These numbers (W2, 3) form a pair. Therefore the letter A is placed in the corresponding cell of the memory chart of FIG. 6 whereupon the chart appears as shown in FIG. 10. When this is done for all elements of the array, the result is shown in FIG. 11. Accordingly, the scan cells containing the letter A in FIG. 11 are those whose contents are to be the inputs to the beam forming accumulator for beam A.

To determine the scan cell contents required as inputs to the beam-forming accumulator for beam B, rotate the grid to the position where the beam indicating line is aligned with the beam directional arrow for beam B on the array drawing, as shown in FIG. 12. Apply the same procedure as described before, entering the letter B in the appropriate cells in the chart of FIG. 11. When one proceeds in the same manner for the remainder of the beam directions indicated on the array drawing of FIG. 5, and makes appropriate entires into the cells of the chart, the result is as shown in FIG. 13. In this chart of FIG. 13, it is of interest to note that no cell of the matrix has more beam symbols in it than the maximum number of array elements through which a straight line can be drawn, and there will be as many inputs to a beam forming accumulator for any one of the beams, as there are elements in the array. Also, although this example shows only as many beam directions as there are array elements, there may be more beam directions than there are array elements.

Having thus determined which scan cell contents are to be directed to which beam forming accumulators, and considering that each word of the memory will be brought down to the sense register for gating out appropriate bits thereof and then reinserted, as described above, one may construct the AND gate matrix of FIG. 14. In this instance, the sense register is a 6-stage register compared to the 4-stage or 30-stage registers of FIGS. 3 and 4, respectively. Also, the scan frame counter is a modulo 4 counter compared to the modulo 3 and modulo 25 counters of FIGS. 3 and 4, respectively. In this matrix, one input of all gates of a given row is driven by a particular output of the scan frame counter. The other input of all gates of a given column is driven by a particular stage of the in/out sense register. The outputs of all gates go to the inputs of those accumulators whose identification symbol appears in the cell of the matrix of FIG. 13, which corresponds to the AND gate being considered.

Figures 15, 17:
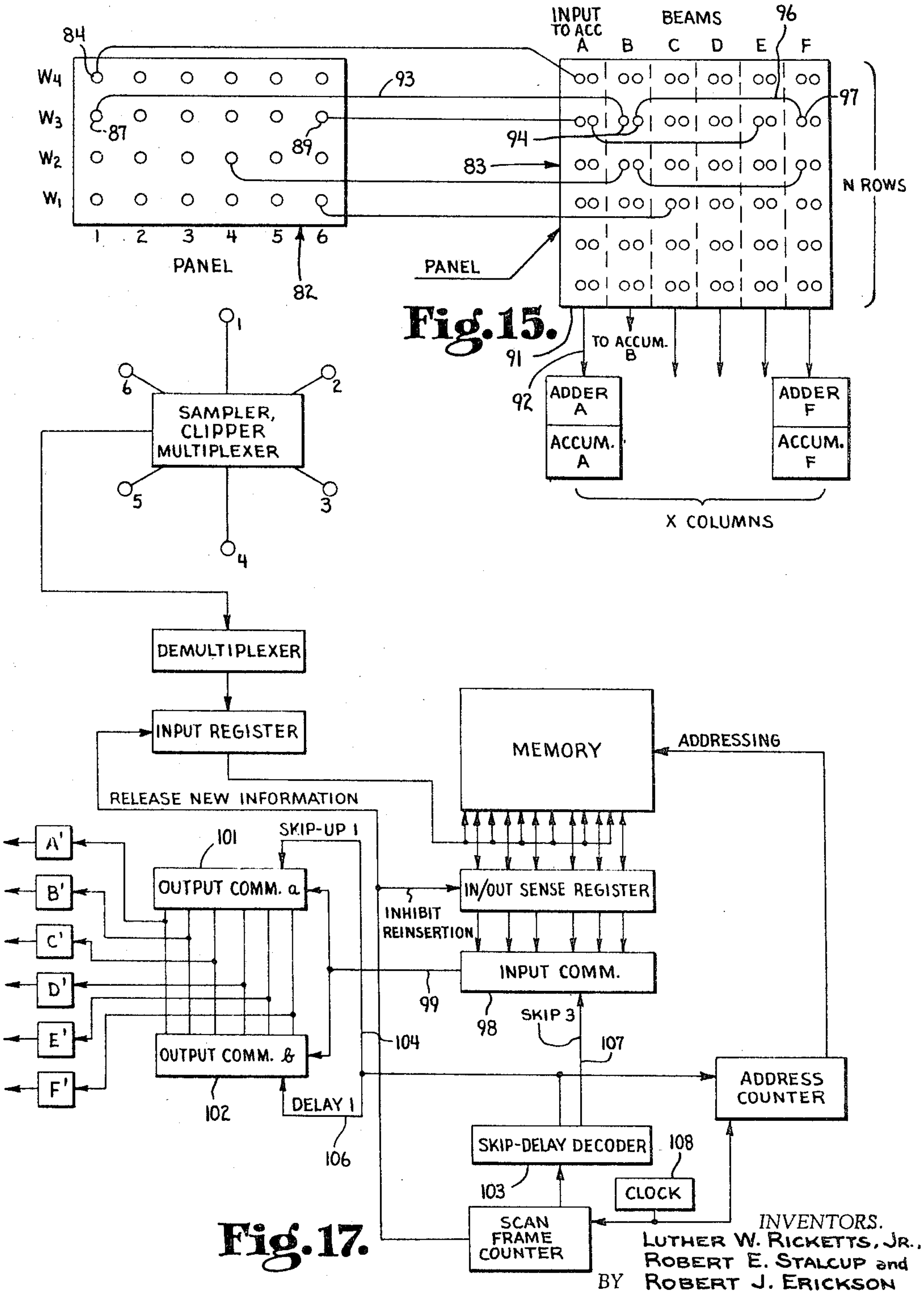
FIG. 15 is a diagram of two jack panels providing a relatively convenient and versatile means for applying the various AND gate outputs of FIG. 14 to the appropriate accumulators.
FIG. 17 is a block diagram representing a commutator arrangement whereby the periodicity shown in FIG. 16 can be exploited.

To program any array configuration, the jack panel arrangement of FIG. 15 may be employed. In this arrangement, a panel 82 and a panel 83 are provided, panel 82 having one jack for each of the AND gates of FIG. 14. For example, the jack 84 provides the output from AND gate 86 of FIG. 14. The jack 87 provides the output from AND gate 88 of FIG. 14. Jack 89 provides the output for AND gate 91 of FIG. 14.

Panel 83 is arranged to take the outputs from panel 82 and direct them to the appropriate accumulators. Panel 83 has "X" number of columns, where "X" is the number of beams to be formed. It has "N" number of rows, where, as before, "N" is the number of array elements used, and therefore the number of column outputs derived from panel 82.

In panel 83, all jacks are double jacks, because the outputs of the second and third rows of panel 82 go to several beam formers. In panel 83, all jacks in any one column are inputs to a single beam-forming accumulator. For example, the double jacks in the first column 91 provide through the line 92 and the adder for beam A, the input to the accumulator for beam A, which is identified in the FIGURE 15 as accumulator A. Therefore each of the columns is designated by a letter corresponding to the beam formed by the accumulator connected to that column. Some connections between panel 82 and 83 corresponding to the requirements of the chart of FIG. 13, are shown in FIG. 15. For example, in the cell (W3, 1) of FIG. 13, the letters BF appear, indicating that the bit from this cell should be applied to the accumulators for beam B and beam F. Referring then to FIG. 15, a wire 93 is connected from the jack 87 of panel 82 for this cell and is connected to the double jack 94 in the column B of panel 83, to supply accumulator B. To provide the connection from jack 87 to a jack in column F of panel 83, the wire 96 is connected to the double jack 94 and to the double jack 97 in panel 83. To avoid undue complication of the drawing of FIG. 15, the drawing does not show all of the connections between the panels and between jacks of panel 83 which would be required by the chart of FIG. 13.

FIG. 16 represents two charts and a portion of a third chart placed side-by-side, these charts being the same as that in FIG. 13 but omitting all letters except A and B. The other letters are omitted to simplify the drawing and to better illustrate a periodicity of patterns which results if the beams to be formed lie in directions for which the array element layout is symmetrical. When this periodicity exists, as shown in FIG. 16, a commutator arrangement for distribution of scan cell contents to proper accumulators can be employed. Such an arrangement is shown in FIG. 17. In FIG. 17, the accumulators for forming the different beams are designated by the beam letter with a prime mark thereafter. These accumulators are different from those used with the previously described embodiments of the invention, because in this instance, as will be seen, the accumulators must count pulses which are not uniformly spaced in time, whereas in the previously described method, the accumulators are connected to their proper bits for the entire time that a word is in the sense register.

Referring further to FIG. 13, but bearing in mind the periodicity illustrated by FIG. 16, one can see that the successive bits of word W4 go to accumulators in the sequence, A B C D E F. The successive bits of W3 go to accumulators in two sequences, one of which is B C D E F A and the other of which is F A B C D E. Of these two latter sequences, one is ahead of the sequence of W4 by one unit and the other is behind that of W4 by one unit. This fact is used in the construction of FIG. 17 wherein the sense register supplies information to an input commutator 98 which successively samples its inputs and presents them as a serialized output on the line 99. The input commutator supplies information to two output commutators 101 and 102, each of which has a single input and successively distributes its input signal to its several outputs. Each of the output commutators has as many outputs as there are beam-forming accumulators (in this instance, six). Corresponding outputs of the two output commutators go to the same accumulator.

The scan cell content distribution to accumulators which was accomplished by the "patch-boarding" described with reference to the panels of FIG. 15, is accomplished in the arrangement of FIG. 17 by programming the degree to which the three commutators are in synchronism with each other, for every word of a scan. In this particular example a skip-delay decoder, 103, driven by the scan frame counter determines, for each word of a scan, the amount of skip or delay to be applied to each of the commutators. The decoder provides a signal on line 104 to the output commutator 101 which will cause it to skip one of its outputs. The decoder also provides the same signal on line 106 to commutator 102 which causes it to delay at one of its outputs. This signal affects the output commutators when a new word comes up in the sense register, for all words of a scan except the first. In this case the decoder provides a signal on line 107 to the input commutator causing it to skip three of its inputs on the first word only of each scan.

The operation of the arrangement is as follows:

W4 is being read and the three commutators are in synchronism so that the input commutator is reading bit one and both output commutators are sending this bit out of their first outputs to accumulator A′. The three commutators step along in synchronism so that bit two goes to accumulator B′, bit three goes to accumulator C′ and so forth. This continues for each of the bits of word 4. When W3 is brought down, output commutator 101 skips ahead one position, and output commutator 102 is delayed one position. The three commutators, two of which are thus shifted, one ahead of and one behind the input commutator, are then out of synchronism and as the input commutator reads bit one of W3, this bit is sent to accumulator B′ by the output commutator 101, but it is sent to accumulator F′ by the output commutator 102. Bit two goes to accumulator C′ from output commutator 101 and to accumulator A′ from output commutator 102. This process continues as W2 and W1 are read. During the processing of W1, both output commutators are in synchronism with each other, but neither with the input commutator. Therefore, when W4 comes up again, all three commutators must be restored to synchronism. This can be done either by advancing both output commutators by three units or by causing the input commutator to skip ahead by three units. In FIG. 17 the line 107 from the skip—delay decoder output for scan word W4 is connected to the input commutator to provide the signal to the input commutator for the skip of three units. In general, the number of output commutators would be the maximum number of array elements through which a straight line can be drawn. An advantage of this commutator method is in the reduction of the number of output gates required, particularly where the number of array elements or the number of delays, or both, is large.

Figure 18:
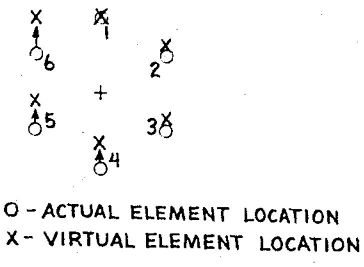
FIG. 18 represents an array drawing similar to that of FIG. 5 but modified to compensate for the effect which would otherwise result if the samples taken at various elements of the array were taken in sequence rather than simultaneously.

Referring again to FIG. 13, the method described for filling the chart assumed that each word of the memory contained samples taken from all elements of the array simultaneously. If the samples are actually taken sequentially (by multiplexing techniques), the chart can still be made by one of the two following ways:

(1) In the first way, the scale drawing of the array is made so that each array element is displaced in the direction of beam formation by a distance proportional to the interval between the sample taken at its element and the sample taken at the first element. This is illustrated in FIG. 18, where a "virtual" element location is provided near each actual element location and is designated by the X in the drawing whereas the actual element location is designated by a circle. The virtual element locations can then be used directly with the grid for filling the chart.

Figure 19:
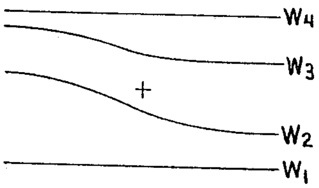
FIG. 19 illustrates a change in grid configuration which could be used as an alternative to the drawing change represented in FIG. 18.

(2) The second way in which the chart can be made is by using distorted (rather than straight, parallel) lines on the overlaying grid. This is shown in FIG. 19, and this distorted grid can be used directly with the actual element locations.

In the above described method of the present invention, the number of words to be used in the memory will be determined based upon the optimum number of delays required for the array configuration, an acceptable rate of read out of the memory considered along with the propagation time across the array, and the sampling frequency desired for keeping the memory information as current as desired.

The core matrix type of digital beam forming performed according to the present invention, can be used for any number of pick-up elements in any rigid pattern and can be used not only for beam directions for which the array element layout is symmetrical but also for beam directions for which the layout is not symmetrical such as might occur in the case of a 12 element array for which thirty beam directions are desired. Among the advantages of this type of beam former over other known types are:

(1) Smaller volume.

(2) Greater economy.

(3) Reduced complexity.

(4) Lower power requirement.

(5) Possibility of time sharing and use as a regular memory for other digital systems.

(6) Reliability when compared to some other processes, since a word located in the memory of the present invention remains in that position in the memory until old enough to be discarded.

(7) Ready adaptability to different array sizes, element numbers, and geometries.

A variety of ways of constructing commutators such as may be used in the embodiment of FIG. 17 will readily suggest themselves to practitioners of the art. Nevertheless, there follows a description of one possible way of implementing such commutators.

Figures 20, 21, 22:
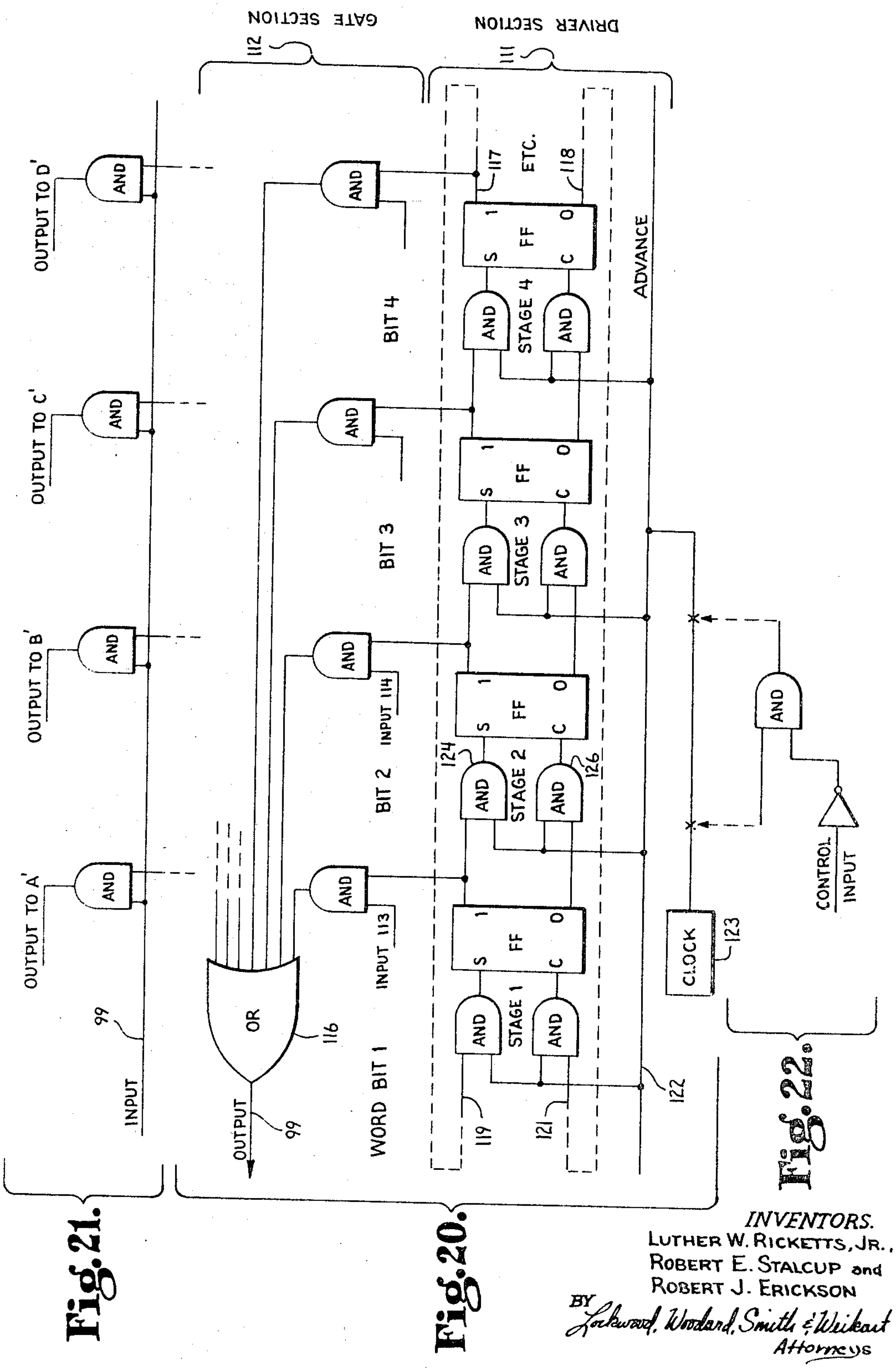
FIG. 20 is a logic diagram of an input commutator useful in FIG. 17.
FIG. 21 is a logic diagram of a gate section which can be substituted for that in FIG. 20 to provide an output commutator.
FIG. 22 is a logic diagram of a control circuitry useful with FIG. 20.

FIG. 20 shows one possible way of making an input commutator for FIG. 17. Logic symbols used are those described in Mil–Std–806B. The commutator consists of two portions, a driver section 111 and a gate section 112. In the gate section, a number of AND gates each having one of two inputs used as a commutator signal input from the sense register is provided. Examples are inputs 113 and 114. The other input of each gate is connected to the driver section and these other inputs are sequentially activated by the driver. All gate outputs are connected to a single "OR" gate 116, whose output is the commutator signal output 99. Since the individual gates are sequentially activated, the effect is as though the commutator signal inputs were sequentially connected to the single commutator output. The driver section is a simple shift register whose outputs, 117 and 118, are connected to its inputs, 119 and 121, as shown by the dotted lines, to form a ring counter. The dotted lines indicate that the number of stages used is arbitrary. The ring counter is constrained (by any of a number of means) to contain but a single logical "1" in one of its stages, while all of the other stages contain logical "0's." Each stage of the counter is connected to the previous stage by a set of AND gates, such as gates 124 and 126, all of which are driven by the "ADVANCE" line 122 connected to a clock 123. These gates allow the transfer of the contents of any register stage to the following stage, so that for every clock pulse which appears on the advance line, the single "1" in the register is transferred from one stage to the next. As this "1" circulates in the register, the successive outputs of the driver section are sequentially activated. This action, of course, sequentially activates the gates of the gate section and the above described operation of commutation is accomplished. It is required that the clock pulse widths be less than the delay per register stage or that the gates connecting register stages be sensitive only to pulse transitions rather than to logic levels in order to assure reliable shift register operation.

While the commutator just described is of the type referred to above as an "Input Commutator," the type of commutator called an "Output Commutator" in the foregoing description may be obtained by substituting the gate section shown in FIG. 21 for the one of FIG. 20. When this is done, the sequential activation of the gates by the driver has the effect of sequentially connecting the single commutator signal input to a number of commutator outputs.

Either of these commutators may be caused to delay its commutation simply by interrupting the signal on the "ADVANCE" line. This may be done by inserting into the "ADVANCE" line, between the points marked X—X, the circuit of FIG. 22. With this modification, the clock output is gated onto the "ADVANCE" line in accordance with the state of the signal existing at the "CONTROL" input. Should the "CONTROL" input be active, the "ADVANCE" line is disconnected from the clock and commutation ceases, or is delayed, until the "CONTROL" input becomes inactive.

Figure 23:
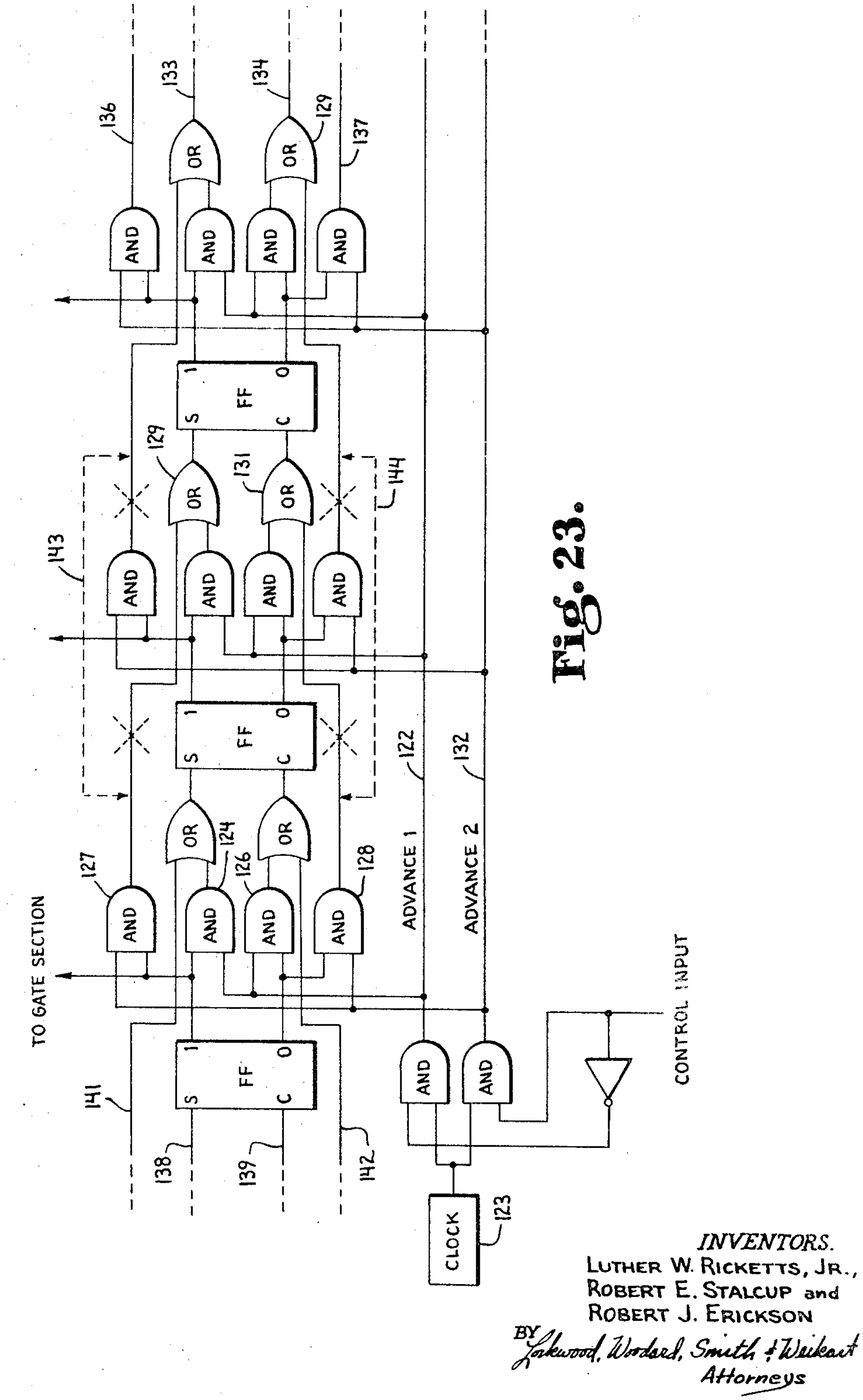
FIG. 23 is a logic diagram of a commutator arranged for skipping operation.

A commutator may be caused to "skip" one or more of its states by modifying its driver section as shown in FIG. 23. In FIG. 23, the gates shown in FIG. 20 which connect each driver stage to the following one are reproduced and have a common connection to the "ADVANCE 1" line; however, they are supplemented by a second set of gates such as 127, 128, 129, 131, which connect each stage to the second one following and which have a common connection to the "ADVANCE 2" line 132. The outputs, 133, 134, 136, 137, are connected to the respective inputs, 138, 139, 141, 142, after passing through an arbitrary number of stages. If clock signals appear only on the "ADVANCE 1" line, the single logical "1" contained in the register progresses from stage to stage with each clock pulse; however, if clock signals appear only on the "ADVANCE 2" line, the logical "1" skips a stage with each clock pulse. Provision is made so that normally clock signals appear only on the "ADVANCE 1" line, but may be transferred instead to the "ADVANCE 2" line when the "CONTROL" input is active. Thus the normal stage-at-a-time progression of the commutator may be changed to a two-stages-at-a-time mode by activation of the "CONTROL" input. A person may re-wire the supplementary gate outputs as shown by the dotted lines 143, 144 to secure three-stages-at-a-time operation if desired. This causes the contents of each stage to be transferred to the third following one. Of course, any other desired skip mode may be implemented by suitable re-wiring.

While the invention has been disclosed and described in some detail in the drawings and foregoing description, they are to be considered as illustrative and not restrictive in character, as other modifications may readily suggest themselves to persons skilled in this art and within the board scope of the invention, reference being had to the appended claims.

The invention claimed is:

1. A beam former comprising:

a group of spatially distributed energy sensing elements;

a memory having a plurality of word containing addresses therein;

register means coupled to said sensing elements and receiving digital signals representing information sampled in said elements, a group of said signals providing a binary word in said register means, said group of signals comprising a signal derived from each sensing element, said register means being coupled to said memory to load said word into an address of the memory, said register means having a plurality of outputs, one output for each bit of a word therein, and said register means being adapted to receive words separately from said memory for presentation of the bits thereof at said outputs;

a plurality of accumulators, one accumulator for each beam to be formed, each accumulator having an input and an output;

and distributing means coupled to said register means outputs and to said accumulator inputs and operable to couple such information bits from each of said words to said accumulators as to enable each accumulator to produce an output for the particular direction of the beam designated to be formed by the accumulator.

2. A beam former as set forth in claim 1 and further comprising:

memory addressing means coupled to said memory to advance through said memory and sequentially read out words from said memory addresses to said register means between successive loadings of new words into said memory, said distributing means being coupled to said addressing means and controlled thereby.

3. A beam former as set forth in claim 2 wherein: said addressing means includes precessing means starting each read out sequence at a different address from that at which the next preceding read out sequence began.

4. A beam former as set forth in claim 2 wherein: said distributing means includes a plurality of like sets of gates, each set having an output coupled to the input of one of said accumulators, and each set having a plurality of gates therein, each different gate having a signal input coupled to one of said register means outputs, and each gate having a control input coupled to said addressing means for receipt of a control signal from said addressing means to gate through a bit from said register means to the output of the gate when said addressing means has read out a certain memory word to said register means.

5. A beam former as set forth in claim 2 wherein: said distributing means includes at least two commutators, said commutators having means therein operable upon changes of words in said register means to shift said commutators with respect to one another.

6. A beam former comprising:

an input register storing as a binary word input signals derived from a plurality of sources;

a memory storing a plurality of binary words therein;

a sense register coupled to said memory and having a plurality of outputs;

loading means coupled to said input register to shift a new word therefrom into said memory;

memory scanning means coupled to said memory and synchronized with the loading means and operative to make a complete read out of all words from the memory during the time between the loading of one new word and the loading of the next subsequent new word into the memory, said scanning means being operative to sequentially read one word at a time out of said memory to said sense register and then reinsert the word from said sense register into the memory address from which it was read, and said scanning means being controlled to avoid reinsertion of the oldest memory word into the address from which it was read during a scan, and to substitute therefor a new word from said input register, said scanning means precessing through the memory to begin successive scans at different memory addresses, and for inserting a new word into a different memory address for each scan;

a plurality of summing means with inputs and outputs;

a plurality of accumulators, each having an input coupled to the output of one of said summing means;

and gates having inputs coupled to said sense register outputs and having outputs coupled to said summing means, said gates being controlled by said scanning means during each complete memory read out to gate bits to a first group of said summing means from said sense register outputs in a first order, and gate bits to a second group of said summing means from said sense register outputs in a second order, whereby bits gated from said sense register outputs to the first group of summing means are of a different age from those gated from said sense register outputs to said second group of summing means.

7. Beam forming apparatus for using a plurality of spatially distributed energy detecting devices to produce at each one of a plurality of signal outputs an output signal generated by energy detected by all of said devices and to compensate for the time delay between the time that an energy signal moving in a first direction first reaches a detecting device and the time the same energy signal reaches the other detecting devices, and to provide different compensations for different ones of said signal outputs so that different directions are represented by the different outputs and each output is for a direction different from the direction for each other output, said apparatus comprising:

a plurality of spatially distributed energy detecting devices;

sampling and converting means coupled to said devices to produce binary signals representative of energy sensed by said devices;

an input register storing a set of binary signals representing energy signals sampled in all detecting devices of said plurality of spatially distributed detecting devices, each set of signals being stored as a binary word in said register;

a memory which may be represented as having rows and columns of storage elements and storing in each different row a word of a different age, each different column having stored therein signals derived from a different one of said detecting devices and all storage elements in any one column having stored therein signals derived from a certain one of said detecting devices;

means coupled to said register for loading said word therefrom into a row of said memory;

a plurality of accumulators, each accumulator having an input;

a plurality of summing devices, each summing device having an output coupled to an input of a different one of said accumulators;

memory addressing means and gating means coupled to said memory and to a first of said summing devices and operable to read a first set of signals from said memory elements to said first summing device such that the differences between ages of members of said first set of signals read to said first summing device are proportional to the differences between distances existing between members of a first set of parallel lines passing through said detecting devices, said distances being measured along a line drawn perpendicularly to said first set of parallel lines, and said detecting devices being the respective sources of said first set of signals;

said addressing means and gating means being coupled to said memory and to a second of said summing devices and operable to read a second set of signals from said memory elements to said second summing device such that the differences between ages of members of said second set of signals read to said second summing device are porportional to the differences between distances existing between members of a second set of parallel lines passing through said detecting devices, said distances being measured along a line drawn perpendicularly to said second set of parallel lines, said second set of parallel lines being disposed at an angle with respect to said first set of parallel lines, and said detecting devices being the respective sources of said second set of signals.

8. The combination comprising:

an array of transducers disposed in a fluid medium and responsive to waves transmitted by said medium;

sampling means sampling information at all transducers of said array simultaneously to produce a group of samples;

converter means producing a binary signal for the sample of each transducer to convert a sample group to a binary sample group;

an input register;

means coupling the signals of each sample group to said input register for storage as a binary word;

a memory having a plurality of like addresses;

means transferring the sample group from said input register to the memory as a word at one of said addresses;

a plurality of accumulating means, each accumulating means having an output for signals representative of one beam;

clock means establishing a sequence of sampling times and coupled to said sampling means to produce samples at said times, and operating during a time equal to the time required for propagation of one of said waves across the greatest dimension of said array in a plane of wave transmission, to produce a number of equally spaced sample groups, the said number being determined by the degree of accuracy and resolution desired, said memory having a number of words therein equal to said number of sample groups, with said transferring means loading each word into a separate one of said addresses;

addressing means coupled to said memory and operative between the loading of each word and the loading of the next subsequent word to read out all words in said memory;

first gating means coupled to said adressing means and said memory and gating to a first of said accumulating means from said memory various bits representing energy derived by said transducers from a wave component moving in a first beam direction;

and second gating means coupled to said addressing means and said memory and gating to a second of said accumulating means from said memory various bits representing energy derived by said transducers from a wave component moving in a second beam direction.

9. The combination of claim 8 and further comprising:

precessing means in said addressing means causing said addressing means to start at different addresses for different memory read outs to enable maintenance of each word at a fixed memory address until discarded and yet enable repetitive read outs of words in the same order by age.

10. A beam former comprising:

a group of spatially distributed energy sensing elements;

a memory having a plurality of word containing addresses therein;

sampling means coupled to said sensing elements and obtaining time spaced frames of samples, said sampling means including means producing in each frame a plurality of digital samples, and said sampling means including means deriving each sample from energy sensed in one of said sensing elements, and said sampling means producing in each sampling frame a number of samples equalling the number of said sensing elements in said group;

loading means coupled to said sampling means to receive the digital sample in a frame as a word, said loading means being coupled to said memory to load said word into an address of the memory, and a register having a plurality of outputs, one output for each bit of a word therein, and said register being coupled to said memory to receive words separately from said memory for presentation of the bits thereof at said outputs;

a first commutator having a plurality of inputs, each input being coupled to a different one of said outputs of said register, said commutator having one output and sequentially coupling its inputs to its output during presence of a word in said register whereby the bits of the word in the register are serially presented at said output;

a plurality of accumulators, one accumulator for each beam to be formed, each accumulator having an input and an output;

a second commutator having a signal input which is coupled to the output of said first commutator, and said second commutator having a plurality of outputs and sequentially coupling its signal input to its said outputs, each different output of said second commutator being coupled to one of said accumulator inputs;

said second commutator being synchronized with said first commutator whereby each bit of the word in said register is coupled to one of said accumulators;

and shifting means coupled to said commutators and operative in synchronism with receipt of a word by said register from said memory to effect a predetermined delay in the sequential coupling by one of said commutators relative to the other of said commutators.

11. A beam former comprising:

a group of wave energy sensing elements spaced symmetrically in a fixed array for receiving in any desired direction;

a word organized memory which may be represented as consisting of rows and columns;

sampling means coupled to said sensing elements and to said memory and successively loading information words into different addresses of said memory, each word containing a received wave energy representing bit for each element of the array, and each word representing a time of sampling different from the time represented by each other word;

a sense register coupled to said memory and having a plurality of outputs, one output for each bit of a memory word;

memory addressing means coupled to said memory to advance through said memory and sequentially read all words out of said memory to said sense register between successive loadings of new words into the memory;

a first commutator having a plurality of inputs, each input being connected to a different one of the said outputs of said sense register, said commutator having one output and sequentially coupling its inputs to its output during the presence of a word in said register whereby the bits of a word in the sense register are serially presented at said commutator output;

a plurality of accumulators, one accumulator for each beam to be formed, each accumulator having an input and an output;

a second commutator having a signal input coupled to the output of said first commutator, and said second commutator having a plurality of outputs and sequentially coupling its signal input to its said outputs, each different output of said second commutator being coupled to the input of one of said accumulators;

the commutation rate of both of said commutators being the same, and said second commutator having a control input and means therein operative upon receipt of a signal at said control input to cause said second commutator to skip coupling to one or more of its outputs and begin sequential coupling with the output next following the last skipped output;

control means operating in conjunction with said addressing means, said control means being coupled to said control input of said second commutator to cause said second commutator to skip one or more outputs each time said control means activates said second commutator;

means coupling said control means to said fisrt commutator and coupling a predetermined count signal once for each cycle of said control means to said first commutator to change said first commutator and synchronize said first and second commutators once for each complete read out of all words.

12. The beam former as set forth in claim 11 and further comprising:

a third commutator having a signal input coupled to the output of said first commutator, said third commutator having a plurality of outputs and sequentially coupling its signal input to its said outputs, each different output of said third commutator being coupled to the input of one of said accumulators, the commutation rate of said third commutator equalling that of said first and second commutators, and said third commutator having a control input and means therein operative upon receipt of a signal at said control input thereof to cause said third commutator to be delayed one or more steps with respect to said first commutator, said control means output being coupled to said control input of said third commutator to cause said third commutator to be delayed one or more steps each time said control means activates said third commutator.

References Cited

UNITED STATES PATENTS

| | | | |
|---|---|---|---|
| 3,039,094 | 6/1962 | Anderson | 343—113 |
| 3,163,844 | 12/1964 | Martin | 340—6 |

RICHARD A. FARLEY, *Primary Examiner.*

U.S. Cl. X.R.

340—16; 343—113